UNITED STATES PATENT OFFICE.

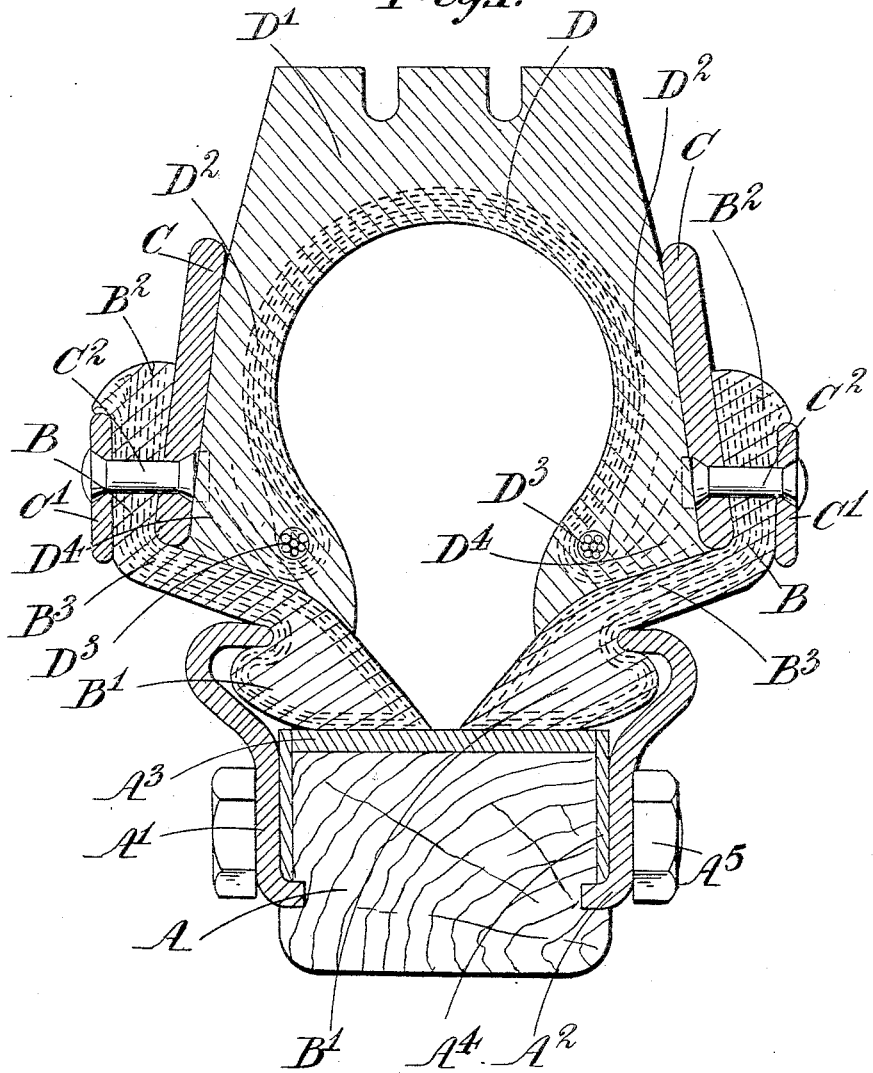

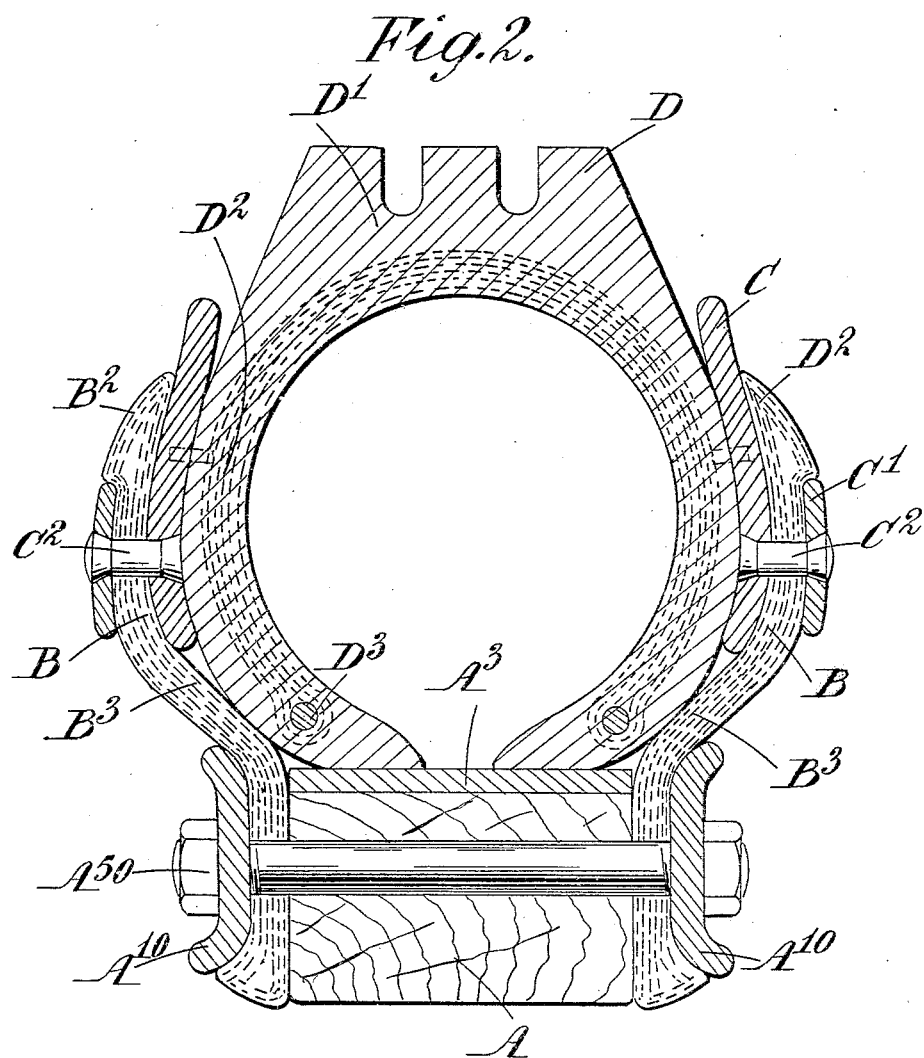

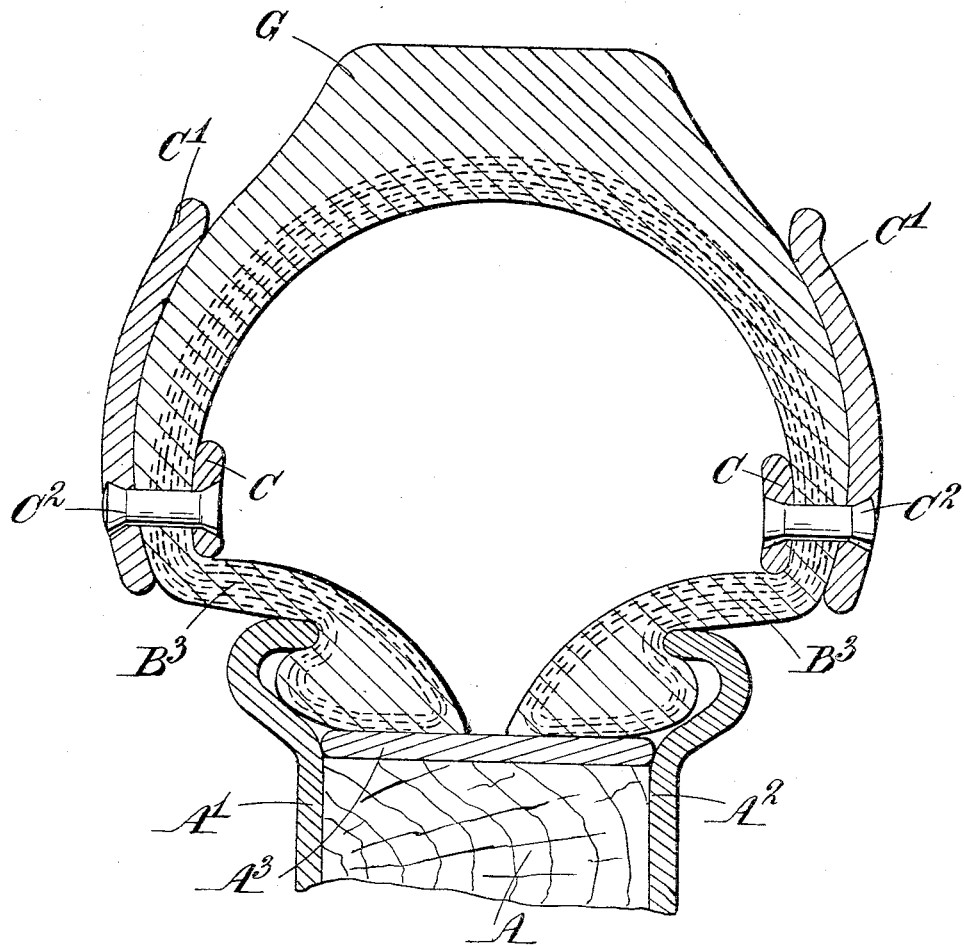

WILLIAM BAKER HARTRIDGE, OF SEAFORD, ENGLAND.

PNEUMATIC TIRE.

962,897.     Specification of Letters Patent.   Patented June 28, 1910.

Application filed August 22, 1908. Serial No. 449,770.

*To all whom it may concern:*

Be it known that I, WILLIAM BAKER HARTRIDGE, a subject of the King of England, residing at Seaford, England, have invented certain new and useful Improvements in or Relating to Pneumatic Tires, of which the following is a specification.

This invention relates to pneumatic tires which have floating supporting rigid metal rings used in the manner hereinafter described.

According to this invention a pneumatic tire has one or more floating rigid flanges or rings secured to each side of the cover; the rings may be secured to the cover and to one another in any desired manner, but those on one side of the cover have no rigid connection with those on the other. By the term "floating ring" I mean that the ring is secured to the tire-cover only and not to any rigid portion of the wheel itself and is therefore free to move independently of the wheel felly. It is not restrained in any way by or in contact with the felly of the wheel.

An air-tube of ordinary type is used with tires constructed according to this invention, and the tire may be adapted to fit on to any rim of known type, preferably of the "clencher" type. The rim is preferably of a standard size to facilitate interchangeability of tires.

Other features of this invention will be evident from the following description, together with the accompanying drawings, in which:—

Figure 1 is a cross-section through the tire, having in this case two rings at each side; Fig. 2 is a cross-section of the tire illustrating a modification. Fig. 3 is a cross-section of another tire and illustrates a further modification.

Referring first to Fig. 1, A is the felly of the wheel. It is provided with two rings $A^1$ and $A^2$ of the shape shown and with a bed-ring $A^3$, the three rings forming a rim of the "clencher" type. The distance between the rings $A^1$ and $A^2$ may be adjusted by the insertion or removal of one or more rings such as $A^4$. The rings $A^1$ and $A^2$ are secured to the felly and to each other by bolts $A^5$ disposed around the wheel. These features, however, do not form part of the present invention.

Each of the lower or wall portions B of the tire comprises the beaded edge $B^1$ adapted to engage with the rim, the portion $B^2$ shaped as shown, and the middle portion $B^3$ which is straight in cross-section, for a reason which will be hereinafter described.

On each of the sides of the portion $B^2$ are floating stiffening rigid metal rings C and $C^1$, the ring C being placed internally, and both rings being secured, preferably by bolts or bolts or rivets $C^2$ passing through the portion $B^2$ and each of the rings. The edge of the portion $B^2$ being thickened as shown, assists the rivets $C^2$ in retaining the wall portion between the two rings.

The upper or tread portion D of the tire comprises the tread proper $D^1$ and an extension $D^2$ on each side adapted to fit between the two rings C on the two portions B of the tire. The edge $D^3$ of the portion $D^2$ is strengthened and thickened as shown, or it may have an inextensible wire in it, and it has preferably a corner $D^4$ fitting against the ring C to assist in retaining the tread in position. The outside surface of the tread may be provided with grooves or the like to increase its grip upon the road, as will be well understood.

When the tire is inflated, the pressure of the air tends to separate the wall portions B with the stiffening rings secured thereto, but the portions $B^3$ of the walls being straight and practically inextensible and the walls B being anchored at $B^1$, counteract this tendency and retain the stiffening rings in their place.

The edges of the rings C and $C^1$ may be rounded wherever desired, to avoid cutting the flexible portions of the tire.

To prevent creeping of the tread relatively to the walls, the rivets or bolts $C^2$ may be extended inward to engage with holes in the portion $D^2$ of the tread; as shown in Fig. 1 of the drawings.

In the modified form of tire shown in Fig. 2 the wall portions B are fixed to the felly by being brought down at the sides thereof and clamped thereto by bolts $A^{50}$ pressing upon rings $A^{10}$. The inextensible edge $D^3$ is in this case in the form of a wire.

In the modified form of tire shown in Fig. 3 the tread portion D and the wall portion B are combined into one complete outer cover G. The rings C and $C^1$ are fixed on this cover so as to be in the same position and act in the same way as before.

In applying to the rim the tire shown in Fig. 1 the procedure adopted is as follows:—One of the rings $A^1$ or $A^2$ is removed, and one of the wall portions B is applied with its beaded edge $B^1$ to engage the other ring $A^2$ or $A^1$. The air tube having been inserted in the tread portion D, this portion is applied in position and the remaining wall portion B is placed against it, the ring $A^1$ or $A^2$ which was removed is then replaced and secured in position by the bolt $A^5$.

The procedure adopted in applying the form of tire shown in Fig. 2 to the rim is similar, except that the wall portions B instead of having their edges $B^1$ engaged with the rings $A^1$ or $A^2$, are clamped between the felly and one of the rings $A^{10}$.

The form of tire shown in Fig. 3 may be so constructed that it can be applied to the rim just like an ordinary tire, or one of the rings $A^1$ $A^2$ may be taken off as before.

What I claim as my invention and desire to secure by Letters Patent is:—

1. A pneumatic tire of the clencher type, having rim-engaging portions, and a stiffening ring adjacent each rim-engaging portion, that portion of the tire between each rim-engaging portion and the adjacent stiffening ring being disposed to receive longitudinal stress when the tire is inflated, substantially as described.

2. In a pneumatic tire the combination with a flexible wall of two floating rings secured one to each side of the wall by local fastenings which do not extend through the tire to the other side.

3. In a pneumatic tire the combination with a tread portion of separate walls provided with ring-supports secured one on each side of the wall by local fastenings which do not extend through the tire to the other side.

4. In a pneumatic tire the combination with a tread portion having stiffening or inextensible edges of separate flexible stiffened walls and having beaded edges substantially as described.

5. A pneumatic clencher tire, having a rim engaging portion and a stiffening ring on each side of the tire and secured to the rim engaging portions, said stiffening rings being interposed between the side walls of the tread and the respective rim engaging portions to prevent separation of the sides of the tire when inflated; substantially as described.

In testimony whereof I have signed my name to this specification in the presence of two subscribing witnesses.

WILLIAM BAKER HARTRIDGE.

Witnesses:
 WM. JNO. TENNANT,
 HARRY B. BRIDGE.